G. D. LAWSON & A. WHEELER.
NUT LOCK.
APPLICATION FILED MAR. 14, 1908. RENEWED APR. 5, 1909.
938,880.
Patented Nov. 2, 1909.
2 SHEETS—SHEET 1.
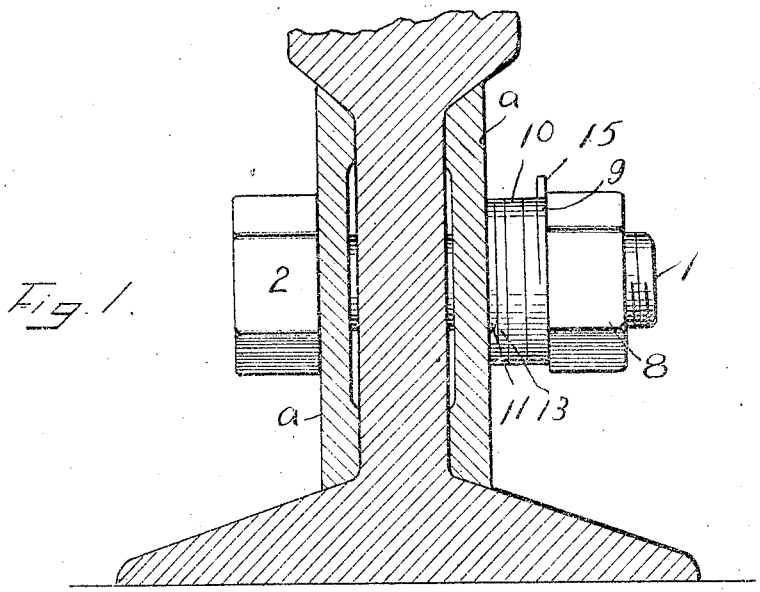
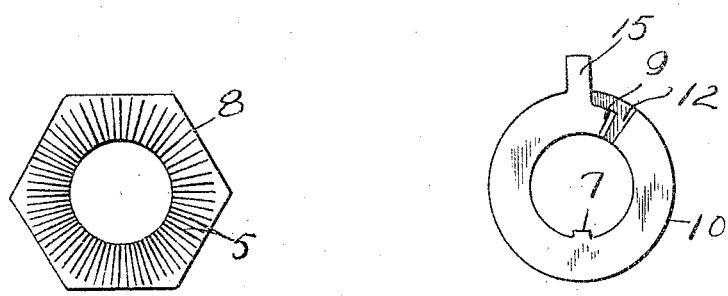 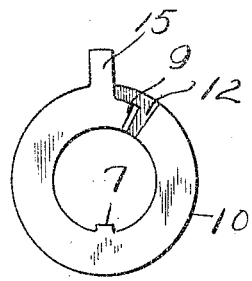
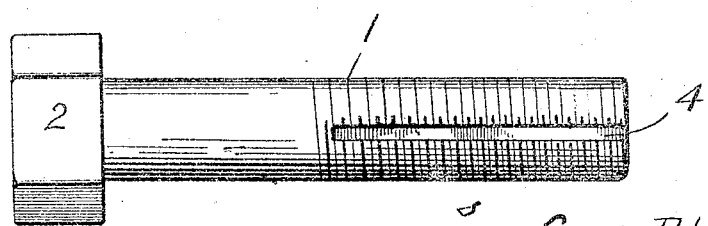
Witnesses
J. C. Simpson
Geo. W. Tues.
Inventors
George D. Lawson,
Andrew Wheeler.
By Chandler & Chandler
Attorneys

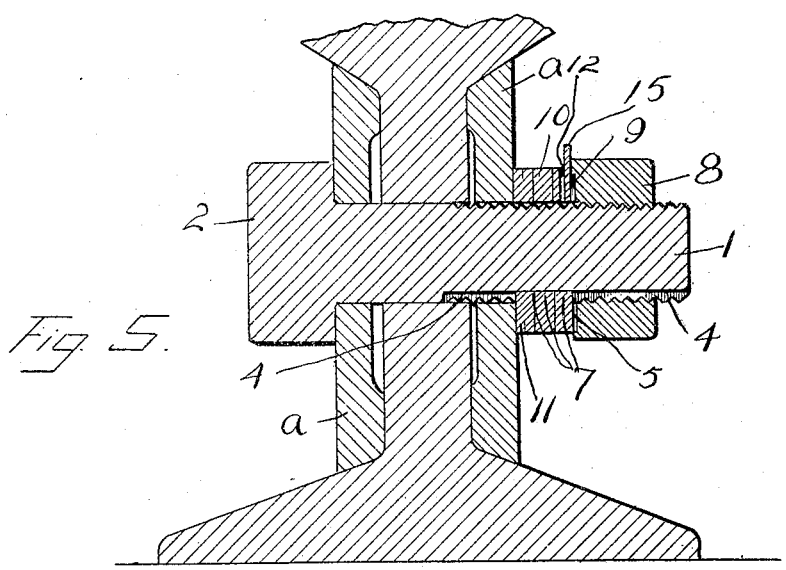
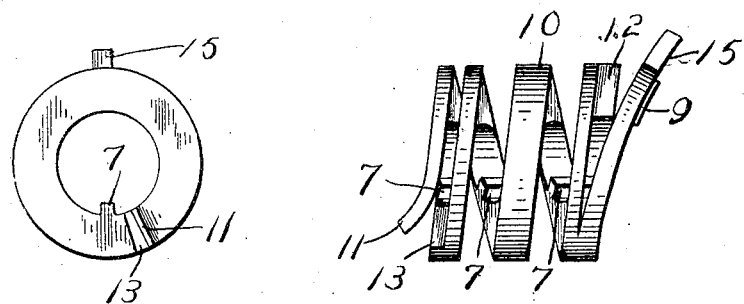

UNITED STATES PATENT OFFICE.

GEORGE D. LAWSON AND ANDREW WHEELER, OF ROSE HILL, VIRGINIA.

NUT-LOCK.

938,880.  Specification of Letters Patent.  Patented Nov. 2, 1909.

Application filed March 14, 1908, Serial No. 421,164. Renewed April 5, 1909. Serial No. 488,070.

*To all whom it may concern:*

Be it known that we, GEORGE D. LAWSON and ANDREW WHEELER, citizens of the United States, residing at Rose Hill, in the county of Lee, State of Virginia, have invented certain new and useful Improvements in Nut-Locks; and we do hereby declare the following to be a full, clear, and exact description of the invention, such as will enable others skilled in the art to which it appertains to make and use the same.

This invention relates to certain new and useful improvements in nut locks the object being to provide a fastening whereby nuts subjected to jolting and jarring movements are securely locked against accidental backward rotation, and embodies a spring washer, a nut, and a bolt of peculiar construction, as will be described more fully hereinafter.

In the accompanying drawings Figure 1 shows a sectional view of a rail joint provided with one of our nut locks. Fig. 2 shows an end view of the nut. Fig. 3 shows a face view of the washer. Fig. 4 shows a plan view of the bolt as used in our invention. Fig. 5 shows a sectional view of a rail joint provided with our nut locking device. Fig. 6 shows a bottom view of the spring washer, while Fig. 7 is an enlarged detail of the spring washer.

In fulfilment of the aim of our invention we employ a bolt 1, of any conventional form provided with a head 2 and longitudinally with the groove 4, as disclosed in Fig. 4. In connection with this bolt 1 we use a nut 8 provided with the ratchet faced base surface 5, as disclosed in Fig. 2.

In Fig. 5, we disclose two fish plates held by means of one of our peculiarly constructed bolts 1. To hold the nut 8 upon the bolt against backward rotation we employ a spiral spring washer 10, the two ends 9 and 11 of which are bent upwardly and downwardly, respectively to provide engaging lips adapted to work into the seatings of the ratchet faced nut 8 and the fish plate.

As shown in Fig. 7 the spring washer at each end is provided with a seating 12 and 13 within which the spring ends 9 and 11 are held when the washer is compressed.

In Fig. 5 we have disclosed the spring washer as interposed between a fish-plate $a$ and the nut 8. If desired, the washer may be placed below the head 2 of the bolt.

As disclosed in Fig. 3 the top portion of the spring lip 9 is provided with a tab 15 so arranged that this engaging end of the spring washer may be forced backward in unthreading the nut. The coil portions of this spring washer are provided with a spline 7 adapted to work and slide within the groove 4 of the bolt to hold this washer against rotation.

In securing the fish plate or other objects between the bolt head and nut the spring washer is interposed and permits a ready locking rotation of the nut.

When the spring washer is fully compressed the lip 9 is in engagement with the ratchet under face of the nut while the lip 11 is in spring pressed engagement with the fish plate so that the lip 11 holds the washer against backward rotation, while the lip 9 prevents the nut from backwardly rotating. Now, when it is desired to release the spring held nut the operator grasps the tab 15 and forces the engaging end 9 into the seating 12 so that this end 9 is carried out of the ratchet groove or seating within the nut enabling the operator to backwardly rotate the nut.

This construction prevents any accidental backward rotation of the nut while providing means whereby the nut may be readily removed without destroying any part or parts of the operating mechanism.

Having thus described our said invention, what we claim as new and desire to secure by U. S. Letters Patent is—

1. In a locking mechanism of the character described, the combination with a bolt provided with a longitudinal groove, of a nut having a ratchet underface, and a spline provided coil washer, one end of which is bent to provide an engaging lip to be held in spring pressed contact with the ratchet underface of said nut, said washer having a seat adapted to receive said lip, the lip end of said washer having a projecting tab, all arranged as set forth.

2. A locking washer of convolute form, the ends of the washer being reduced, and the body of the washer directly beneath each free end portion being reduced in thickness to a degree to permit the free end portion to lie below the outer face of the adjacent thickened portion, each extremity of the washer being turned outwardly.

3. A locking washer of convolute form, the ends of the washer being reduced, and the body of the washer directly beneath each free end portion being reduced in thickness to a degree to permit the free end portion to lie below the outer face of the adjacent thickened portion, each extremity of the washer being turned outwardly, the washer at one extremity having a radiating lug.

In testimony whereof, we affix our signatures, in presence of two witnesses.

GEORGE D. LAWSON.
ANDREW WHEELER.

Witnesses:
J. W. LAWSON,
THOMAS COPS.